US 8,315,846 B2
Nov. 20, 2012

(12) United States Patent
Nakamura et al.

(10) Patent No.: US 8,315,846 B2
(45) Date of Patent: Nov. 20, 2012

(54) DESIGN DATA MERGING APPARATUS AND DESIGN DATA MERGING METHOD

(75) Inventors: Takeo Nakamura, Kawasaki (JP); Miki Takagi, Kawasaki (JP); Junko Taira, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 452 days.

(21) Appl. No.: 12/758,133

(22) Filed: Apr. 12, 2010

(65) Prior Publication Data

US 2010/0262270 A1 Oct. 14, 2010

(30) Foreign Application Priority Data

Apr. 14, 2009 (JP) ................................. 2009-098252

(51) Int. Cl.
*G06G 7/48* (2006.01)
(52) U.S. Cl. ............................................. 703/7; 700/97
(58) Field of Classification Search .................. 703/1, 7;
700/97, 182; 705/7, 17.32, 29; 345/416;
716/11; 707/2, 103 R
See application file for complete search history.

(56) References Cited

U.S. PATENT DOCUMENTS

| 5,841,981 | A | | 11/1998 | Kondo | |
|---|---|---|---|---|---|
| 5,999,908 | A | * | 12/1999 | Abelow | 705/7.32 |
| 2003/0130758 | A1 | * | 7/2003 | Hirano et al. | 700/182 |
| 2005/0049883 | A1 | * | 3/2005 | Boroson et al. | 705/1 |
| 2006/0195419 | A1 | * | 8/2006 | Tenma et al. | 707/2 |
| 2008/0015823 | A1 | * | 1/2008 | Arnold et al. | 703/1 |
| 2008/0077902 | A1 | * | 3/2008 | Harashima et al. | 716/11 |
| 2008/0086347 | A1 | * | 4/2008 | Yokota et al. | 705/7 |
| 2008/0300832 | A1 | * | 12/2008 | Ueda | 703/1 |
| 2008/0301012 | A1 | * | 12/2008 | Cogswell et al. | 705/29 |
| 2009/0033656 | A1 | * | 2/2009 | Larkins et al. | 345/419 |
| 2009/0049081 | A1 | * | 2/2009 | Loberg | 707/103 R |
| 2009/0069920 | A1 | * | 3/2009 | Franzen et al. | 700/97 |

FOREIGN PATENT DOCUMENTS

JP 9-153011 A 6/1997

OTHER PUBLICATIONS

Bohm, M.R., "Architecting design repositories to support knowledge storage, reuse and design tool generation", University of Missouri-Rola, 2004.*
Bliznakov, P.I., "design Information framework to support engineering design process", Arizona State University, 1996.*

* cited by examiner

*Primary Examiner* — Kandasamy Thangavelu
(74) *Attorney, Agent, or Firm* — Westerman, Hattori, Daniels & Adrian, LLP

(57) ABSTRACT

A design data merging apparatus includes a merging determining unit that determines, for a plurality of design data of which each has product name information and has a same identifier for uniquely identifying a product, whether the product name information given to the plurality of design data are the same, and a merged data creating unit that merges the plurality of design data when it is determined by the merging determining unit that the product name information given to the plurality of design data are the same, and creates merged data obtained by merging a plurality of design data.

7 Claims, 18 Drawing Sheets

FIG.4

●: ARRANGED, BLANK: NOT YET ARRANGED

NETWORK PORTION
DEVICE CONFIGURATION PORTION
POWER SUPPLY PORTION

| IDENTIFIER | DATA 1 | | | | DATA 2 | | | | DATA 3 | | | | MERGED DATA | | | | REMARKS |
|---|---|---|---|---|---|---|---|---|---|---|---|---|---|---|---|---|---|
| IDENTIFIER A | PRODUCT NAME (1) | ● | | | PRODUCT NAME (1) | | ● | | PRODUCT NAME (1) | | | | PRODUCT NAME (1) | ● | ● | ● | CASE IN WHICH MERGING CAN BE PERFORMED WITHOUT INCONSISTENCY |
| IDENTIFIER B | PRODUCT NAME (1) | | ● | | PRODUCT NAME (2) | | ● | | PRODUCT NAME (1) | | | | PRODUCT NAME (1) | ● | × | ● | DATA 2 HAS DIFFERENT PRODUCT NAME (DECISION BY MAJORITY) →MANUAL DETERMINATION |
| IDENTIFIER C | PRODUCT NAME (2) | ● | | | PRODUCT NAME (2) | | | | | | ● | | PRODUCT NAME (2) | ● | ● | | |
| IDENTIFIER D | | | | | | | | | PRODUCT NAME (2) | | ● | | | | | | ONLY IDENTIFIER D OF DATA 3 STANDS ALONE AND POWER SUPPLY UNIT OF IDENTIFIER C IS VACANT →IT IS DETERMINED THAT IDENTIFIER OF DATA 3 IS C |
| IDENTIFIER E | | | | | | | | | PRODUCT NAME (3) | | ● | | | | | ● | |

FIG.7

CONCORDANCE RATE={(x*a|x*b)+y*c+z*d}/(i1+i2+i3)*100 ...(0 TO 100%)
CONCORDANCE RATE: x, y, z (NATURAL NUMBER OF 0 TO 100)
WEIGHTING: d>a>b>c (a, b, c, AND d ARE RESPECTIVELY 0 TO 100%)

FIG.12

| CORRESPONDENT PROBABILITY % | DATA 1 | DATA 2 | DATA 3 | MERGED DATA |
|---|---|---|---|---|
| 56% | A PRODUCT (1)-N WEB SERVER 1 | F PRODUCT (1)-K WEB-SERVER | K PRODUCT (1)-P WEB | A PRODUCT (1)-N, K, P |
| 50% | B PRODUCT (1)-N DATA SERVER | H PRODUCT (1)-K SERVER | L PRODUCT (1)-P SERVER | B PRODUCT (1)-N, K, P |
| 50% | C PRODUCT (1)-N DATA SERVER 1 | G PRODUCT (1)-K DATA-SERVER | M PRODUCT (1)-P ??? | C PRODUCT (1)-N, K, P |
| 90% | D PRODUCT (2)-N | I PRODUCT (2)-K | O PRODUCT (2)-P | D PRODUCT (2)-N, K, P |
| 90% | E PRODUCT (3)-N | J PRODUCT (2)-K | P PRODUCT (3)-P | E PRODUCT (3)-N, K, P |

REPLACEMENT

FIG.13

| IDENTIFIER | DATA 1 | DATA 2 | DATA 3 | MERGED DATA |
|---|---|---|---|---|
| A | PRODUCT (1)-N | | | |
| B | PRODUCT (1)-N | | | |
| C | PRODUCT (1)-N | | | |
| D | PRODUCT (2)-N | | | PRODUCT (2)-N, K, P |
| E | PRODUCT (3)-N | | | PRODUCT (3)-N, K, P |
| F | | PRODUCT (1)-K | | |
| G | | PRODUCT (1)-K | | |
| H | | PRODUCT (1)-K | | |
| I | | PRODUCT (2)-K | | |
| J | | PRODUCT (3)-K | | |
| K | | | PRODUCT (1)-P | |
| L | | | PRODUCT (1)-P | |
| M | | | PRODUCT (1)-P | |
| N | | | PRODUCT (2)-P | |
| O | | | PRODUCT (3)-P | |

N: NETWORK, K: DEVICE CONFIGURATION, P: POWER SUPPLY

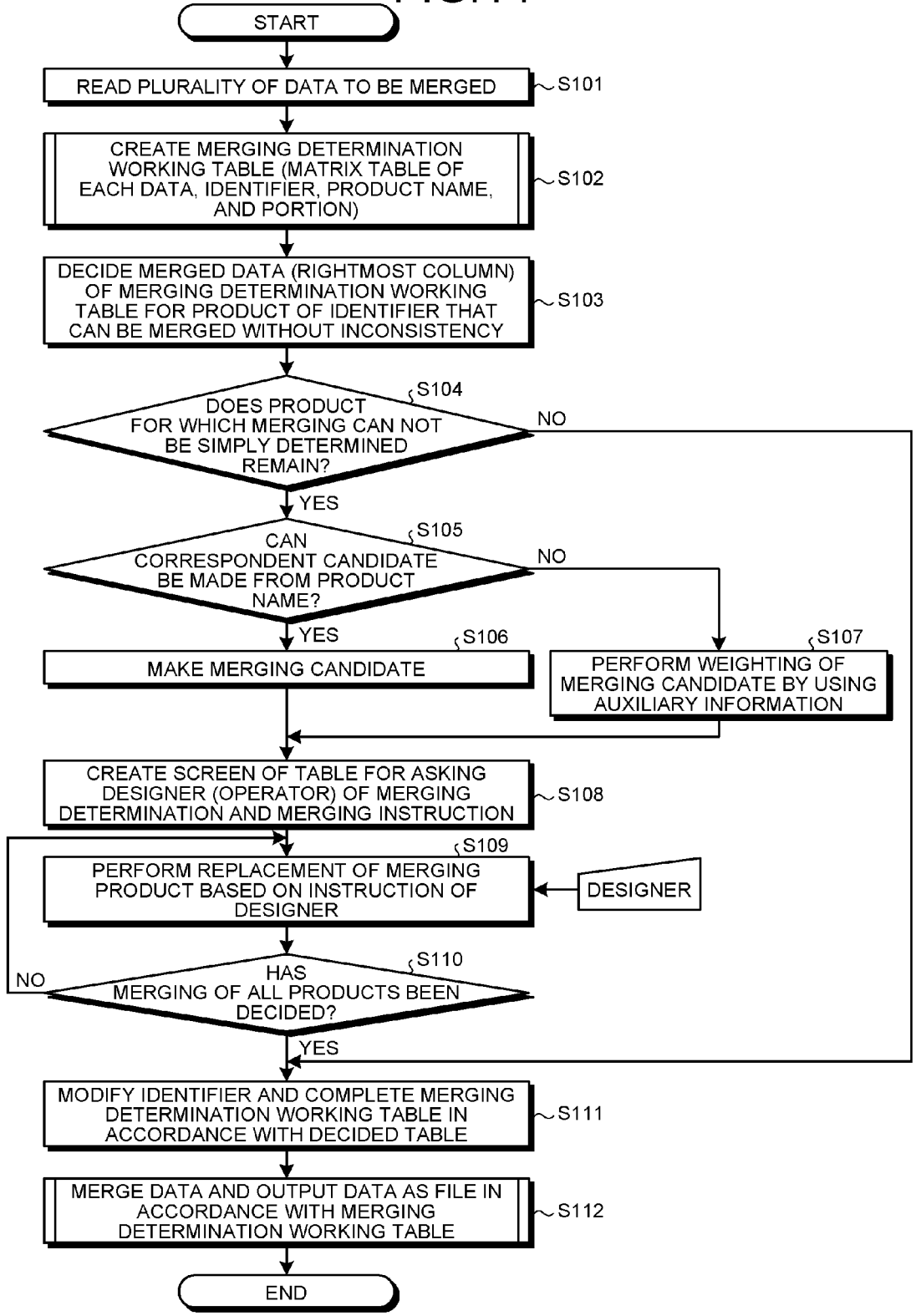

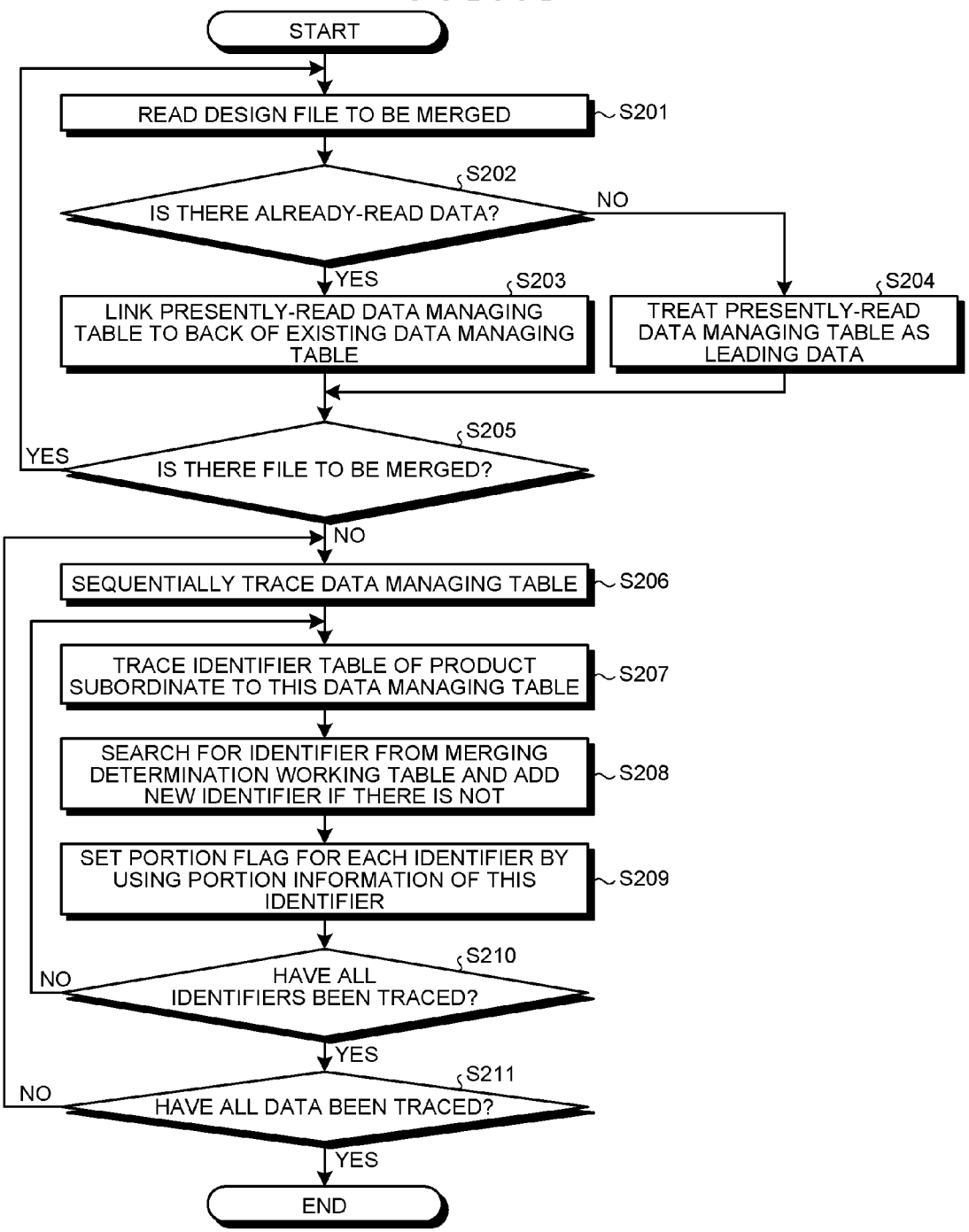

DESIGN DATA MERGING APPARATUS AND DESIGN DATA MERGING METHOD

CROSS-REFERENCE TO RELATED APPLICATION(S)

This application is based upon and claims the benefit of priority of the prior Japanese Patent Application No. 2009-098252, filed on Apr. 14, 2009, the entire contents of which are incorporated herein by reference.

FIELD

The embodiments discussed herein are directed to a design data merging apparatus, a design data merging method, and a design data merging program for merging a plurality of design data that is designed from different aspects for one product.

BACKGROUND

In recent years, CAD technologies or the like that are design support techniques for making a series of works more efficient and of higher-quality, such as an initial design, a verification, a test, laying, or an operation of a complicated and large-scale network infrastructure (for example, servers and storage groups of an IDC center or the like and a network configuration for connecting them) have been known as disclosed in, for example, Japanese Laid-open Patent Publication No. 09-153011.

A design work of a network infrastructure generally consists of three design processes that are a logical network design for linking apparatuses, a detailed configuration design of an apparatus, and a power supply system design of an apparatus. The design processes and persons in charge of designs are separated for each process and the processes are independently designed.

For this reason, as illustrated in FIG. 18, there is utilized a CAD system that can handle one apparatus by dividing (referred to as portion division) the apparatus into a network, a device configuration, and a power supply. Moreover, as illustrated in FIG. 19, the description of such a CAD system can be divided into a network diagram, a detailed configuration diagram, and a power supply system diagram.

One product consists of a plurality of portions, and each portion has a symbol that expresses a function thereof. An identifier (in the example of FIG. 19, an identifier "A" and an identifier "B") for uniquely identifying a product is given to the product by arranging the symbol of each product on a drawing. Therefore, even when identical products are arranged, each product can be distinguished.

Three types of design data of an apparatus are design data related to one apparatus physically. The plurality of design data designed from the different aspects are merged. Specifically, the work for manually merging design data is performed in consideration of identifiers and apparatus names applied to the design data conventionally.

The persons in charge of the respective design data are different in the above-described technology for manually merging design data. Because identifiers for apparatuses may be overlapped or the persons in charge of the designs may use different apparatus names in some cases, the merging work is burdensome and the design data for each product is not efficiently managed.

SUMMARY

According to an aspect of an embodiment of the invention, a design data merging apparatus includes a merging determining unit that determines, for a plurality of design data of which each has product name information and has a same identifier for uniquely identifying a product, whether the product name information given to the plurality of design data are the same, and a merged data creating unit that merges the plurality of design data when it is determined by the merging determining unit that the product name information given to the plurality of design data are the same, and creates merged data obtained by merging a plurality of design data.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 4 is a diagram illustrating an example of a merging determination working table;

FIG. 7 is a diagram illustrating an example of a computational equation for computing a correlation;

FIG. 12 is a diagram illustrating an example of a manual association instruction screen;

FIG. 13 is a diagram illustrating an example in which identifiers between data are not identical to each other;

FIG. 14 is a flowchart illustrating a process operation performed in the design data merging apparatus according to the first embodiment;

FIG. 15 is a flowchart illustrating a process operation for creating the merging determination working table of the design data merging apparatus according to the first embodiment;

DESCRIPTION OF EMBODIMENT(S)

Preferred embodiments of the present invention will be explained with reference to accompanying drawings. The present invention is not limited to the embodiments explained below.

[a] First Embodiment

Hereinafter, it will be sequentially explained about the configuration and the process flow of a design data merging apparatus according to the first embodiment and be finally explained about an effect according to the first embodiment.

Configuration of Design Data Merging Apparatus

Figure 1:
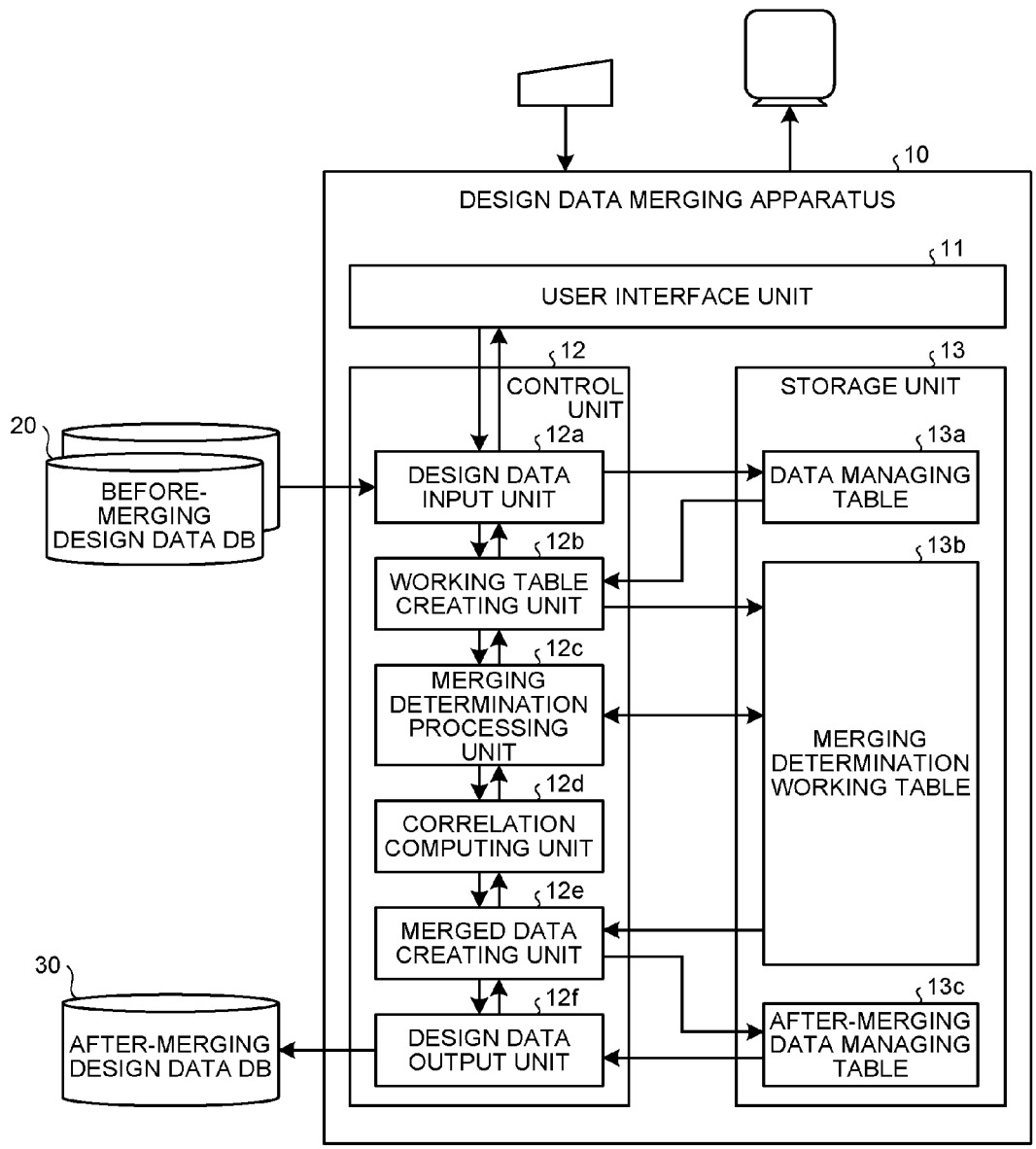
FIG. 1 is a block diagram illustrating the configuration of a design data merging apparatus according to a first embodiment.

Firstly, it will be explained about the configuration of a design data merging apparatus 10 with reference to FIG. 1. FIG. 1 is a block diagram illustrating the configuration of the design data merging apparatus 10 according to the first embodiment. As illustrated in FIG. 1, the design data merging apparatus 10 includes a user interface unit 11, a control unit 12, and a storage unit 13. The design data merging apparatus 10 is connected to a before-merging design data DB (Data Base) 20 that stores design data for all portions that are designed in separate aspects and an after-merging design data DB 30 that stores design data obtained by merging data for all portions. Next, it will be explained about the processes of the respective units.

Figure 2:
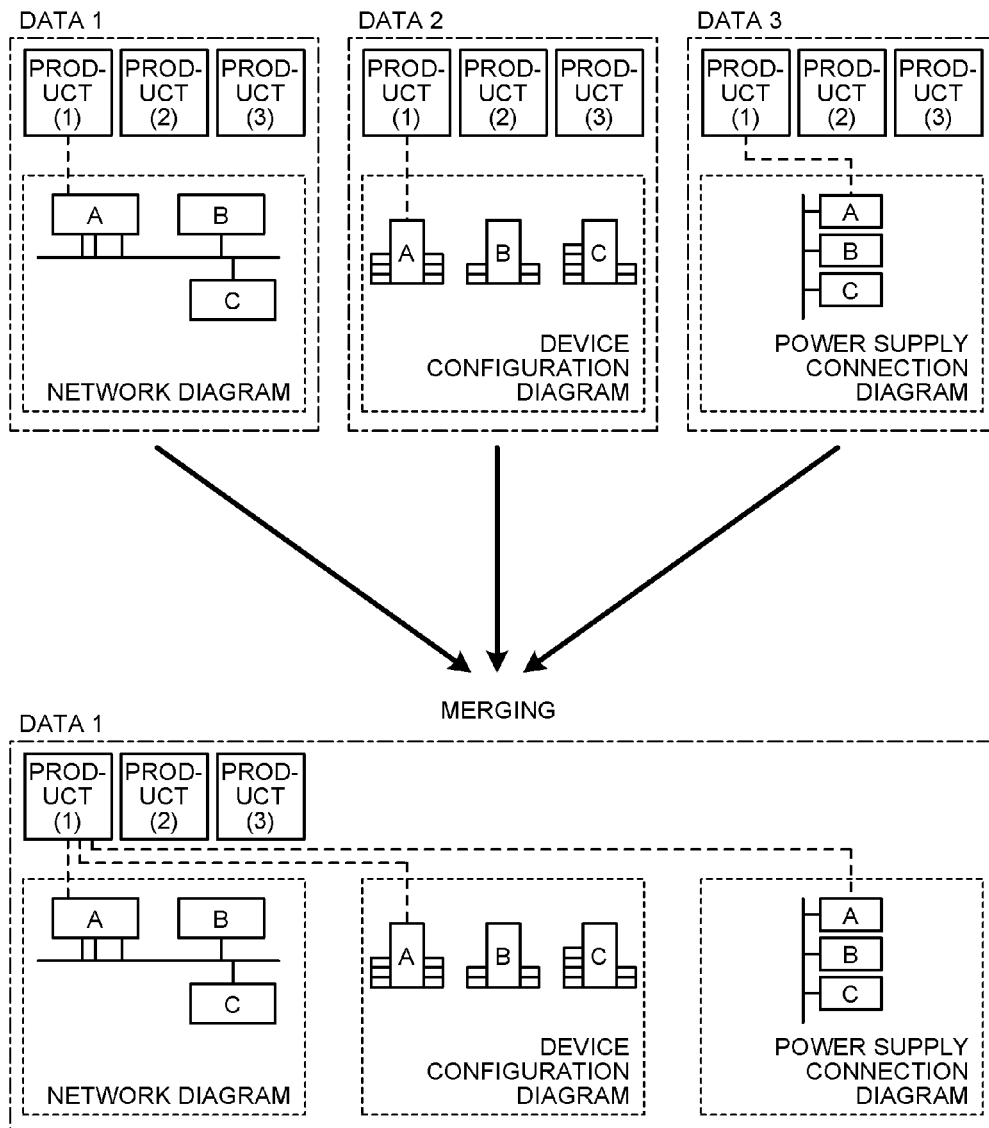
FIG. 2 is a diagram illustrating an example of design data after merging.

As illustrated in FIG. 2, it is summarized that the design data merging apparatus 10 reads out the design data for all portions that are designed in separate aspects from the before-merging design data DB 20, merges the design data for all portions with respect to a common product, and stores the design data after merging in the after-merging design data DB 30.

The user interface unit 11 controls the communication related to various types of information that is exchanged between an input device (for example, a keyboard, a mouse, a microphone, or the like) and an output device (for example, a monitor or a speaker) that are connected to the design data merging apparatus 10.

Moreover, when the identifiers given to respective design data are not identical to one another and a plurality of design data having the same product name exists, the user interface unit 11 outputs an association instruction screen (see FIG. 12 to be below explained in detail) by which a merging instruction for merging any design data of the design data is acquired. Then, when acquiring the merging instruction, the user interface unit 11 informs a merged data creating unit 12e of it.

The storage unit 13 stores therein data and programs for various types of processes performed by the control unit 12. Particularly, the storage unit 13 includes a data managing table 13a, a merging determination working table 13b, and an after-merging data managing table 13c.

Figure 3:
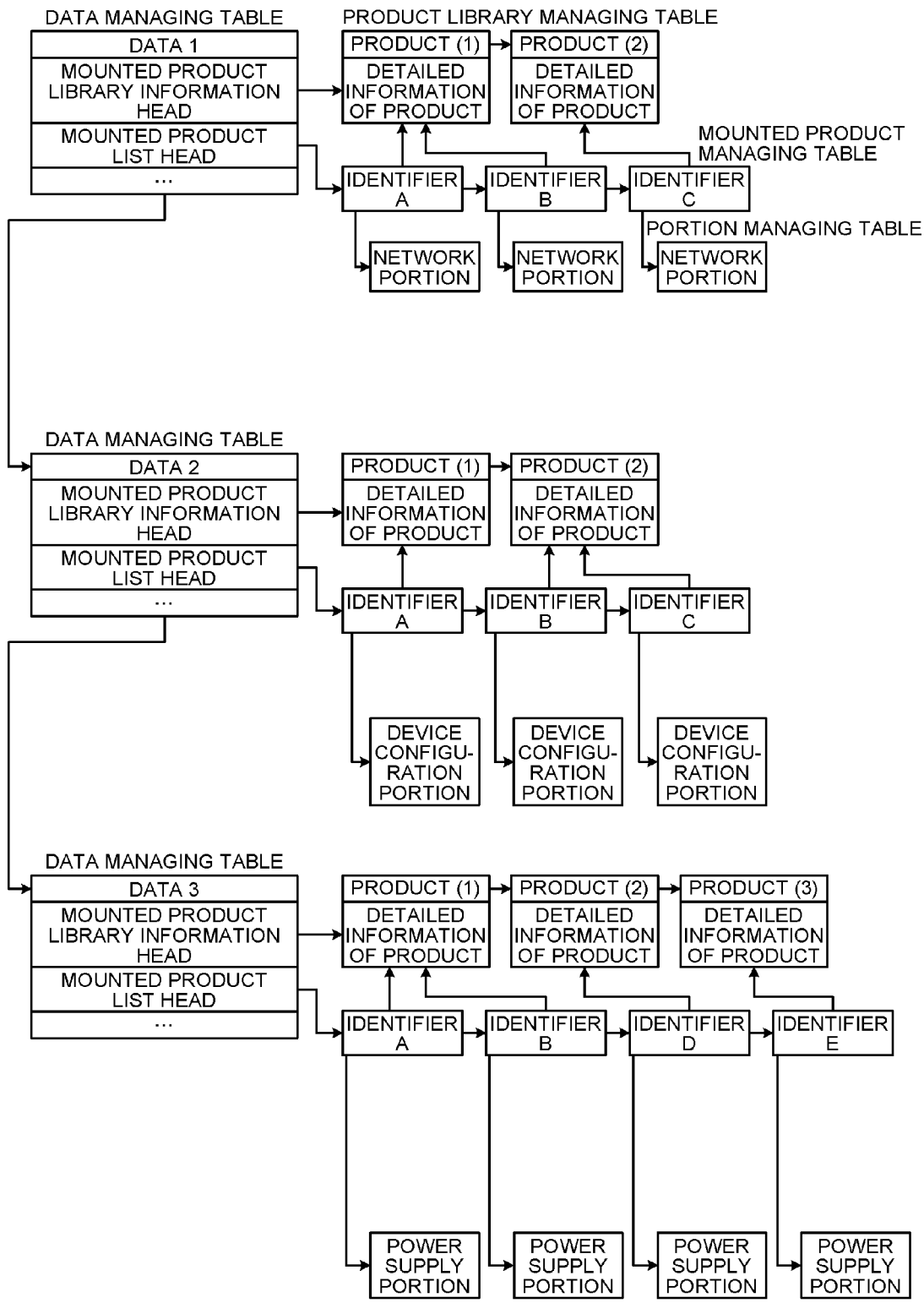
FIG. 3 is a diagram illustrating an example of a data managing table.

The data managing table 13a stores the data structure of design data for each portion. As illustrated in FIG. 3, the data structure of the design data stored by the data managing table 13a includes a management table for each data, and the management table subordinates a product library managing table, a mounted product managing table, and a portion managing table, as product information for constituting the drawing.

As illustrated in FIG. 4, the merging determination working table 13b stores therein the product name of the design data for each portion and the type of the already-arranged (already-input) portion, for each identifier that uniquely identifies a product. The merging determination working table 13b is created by a working table creating unit 12b and referred to by a merging determination processing unit 12c.

Figure 5:
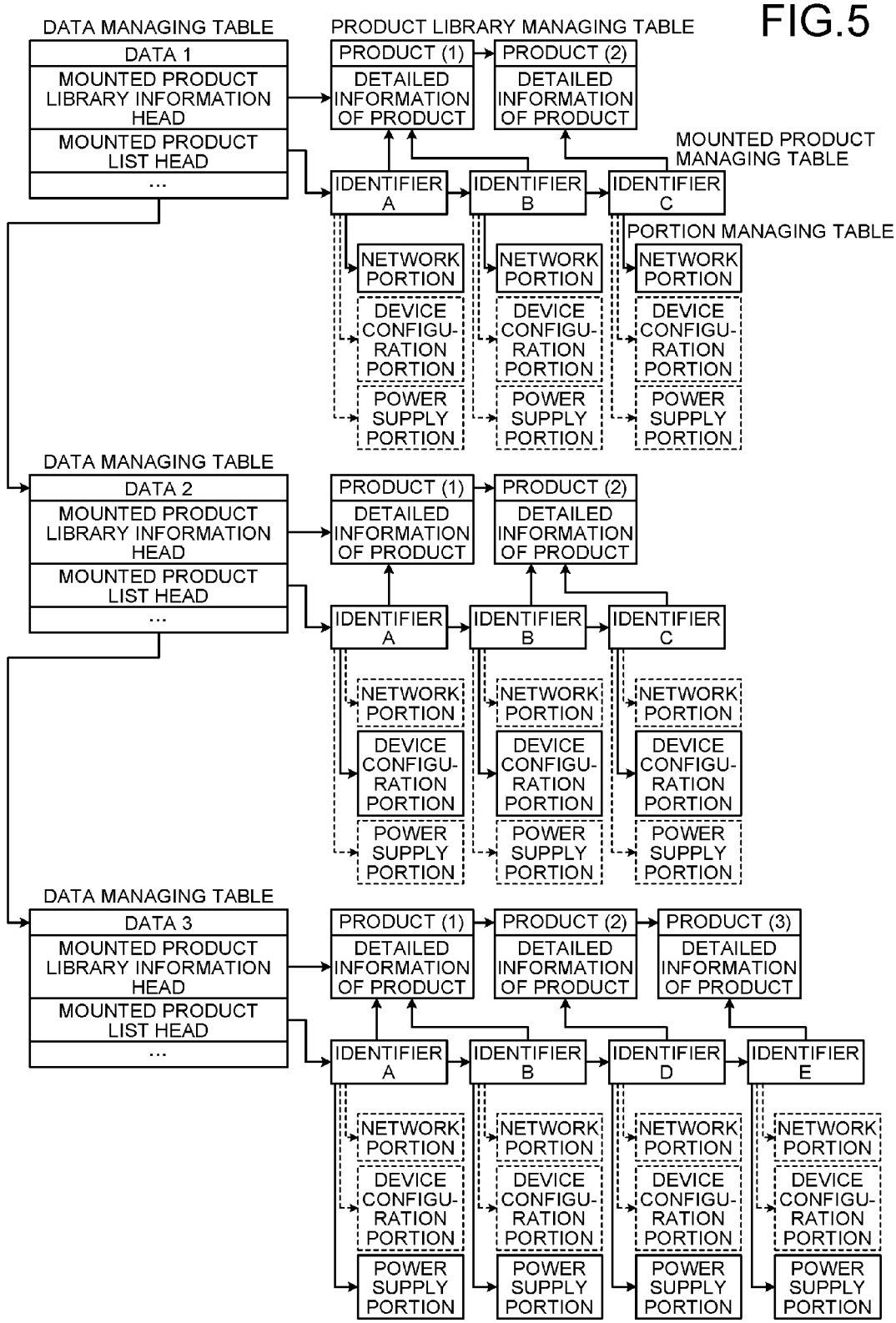
FIG. 5 is a diagram illustrating an example of the data managing table after merging.

The after-merging data managing table 13c stores the data structure of design data after merging that are obtained by merging the design data for all portions with respect to a common product. Specifically, as illustrated in FIG. 5, the after-merging data managing table 13c has a structure in which a management table is provided for each data and each management table subordinates product information management tables that constitute the drawing.

The control unit 12 includes an internal memory. The internal memory stores therein programs defining various types of processing procedures and data. The control unit 12 executes various processes by using these programs and data. Particularly, the control unit 12 includes a design data input unit 12a, the working table creating unit 12b, the merging determination processing unit 12c, a correlation computing unit 12d, the merged data creating unit 12e, and a design data output unit 12f.

The design data input unit 12a reads design data for all portions designed in separate aspects from the before-merging design data DB 20 and makes the data managing table 13a store the data. Specifically, the design data input unit 12a reads a design file to be merged from the before-merging design data DB 20 and determines whether the already-read data exists in the data managing table 13a.

As a result, when the already-read data exists in the data managing table 13a, the design data input unit 12a links the presently-read data managing table at the back of the existing data managing table. On the other hand, when the already-read data does not exist in the data managing table 13a, the design data input unit 12a treats the presently-read data managing table as leading data.

Then, the design data input unit 12a determines whether the file to be merged is still in the before-merging design data DB 20. When the file is still therein, the design data input unit 12a repeats the process for reading the design file to be merged from the before-merging design data DB 20.

The working table creating unit 12b creates a table for performing merging determination on the basis of the design data stored in the data managing table 13a and makes the merging determination working table 13b store the created table. Specifically, the working table creating unit 12b sequentially traces the data managing tables and traces the mounted product managing tables which is subordinate to the data managing tables. Then, the working table creating unit 12b searches for an identifier from the merging determination working table 13b. When the identifier does not exist therein, the working table creating unit 12b newly adds the identifier to create a merging determination working table.

The merging determination processing unit 12c determines whether design data are consistent with each other with respect to the product name, the identifier, and the symbol (portion) that are included in each design data. In other words, when the product name and the identifier are the same among plurality of design data, and each design data corresponds to a portion constituting the product and not overlapped with a portion of other design data for each product having the given identifier, it is the state without inconsistency. In this case, merged data is created by merging the plurality of design data. Because all the portions may not have been input at the time of merging, some portion may not present.

Specifically, for the plurality of design data having the same identifier that uniquely identifies a product, the merging determination processing unit 12c determines whether the product names given to these design data are the same with reference to the merging determination working table 13b, and sets portion flags for the merged data in the merging determination working table 13b.

As a specific example, as illustrated in FIG. 4, when the product names given to the design data 1 to 3 of which the identifier is the same "A" are the same, the merging determination processing unit 12c sets respective portion flags in the merging determination working table 13b on the assumption that the design data can be merged without inconsistency.

On the other hand, when it is determined that the product names given to these design data are not the same, the merging determination processing unit 12c merges the design data having the most frequent product name among the product names given to these design data and creates merged data. For example, in FIG. 4, the product name for data 1 and data 3 is (1) and the product name for data 2 is (2) with respect to the identifier "B". In this case, the merging determination processing unit 12c sets the portion flags for the data 1 and the data 3 in the merging determination working table 13b according to the decision by majority.

Moreover, when there is only one design data having a certain identifier, the merging determination processing unit 12c determines whether design data that has the same product name as that given to the design data exists, and sets a portion flag for merged data in the merging determination working table 13b. Referring to FIG. 4 again, when it is determined that only the identifier "D" stands alone and the power supply portion of the identifier "C" is vacant, the merging determination processing unit 12c assumes that the identifier of data 3 having the identifier "D" is "C" and sets a portion flag in the merging determination working table 13b.

Figure 6:
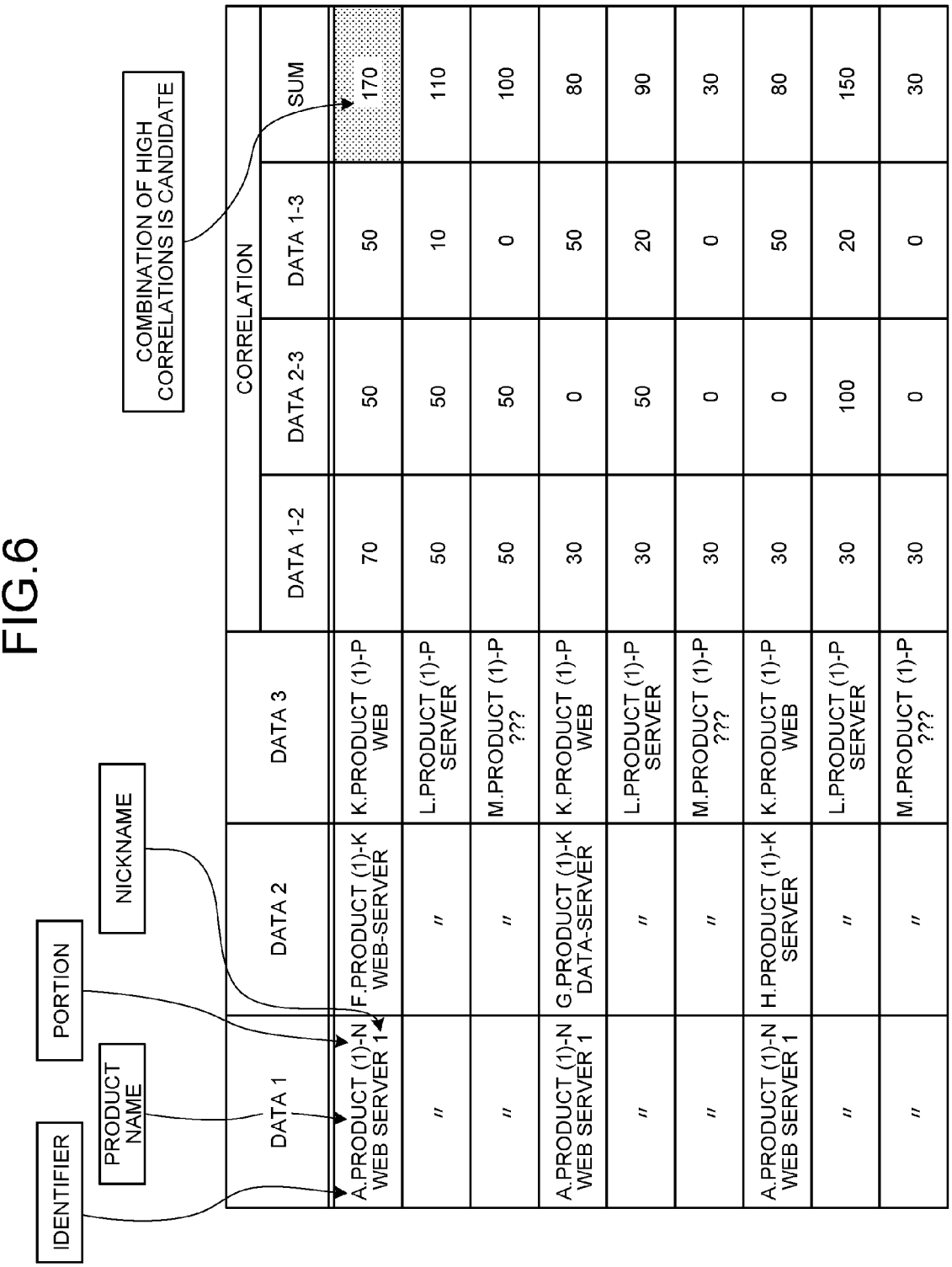
FIG. 6 is a diagram for explaining a correlation among apparatuses.

When there is a plurality of design data of which the identifiers are not identical to one another and the product names are identical to one another (for example, see FIG. 13), the correlation computing unit 12d computes a correlation value indicative of a probability by which these design data are design data related to the same product by using the appellations given to the design data. Then, as illustrated in FIG. 6, the correlation computing unit 12d outputs a data combination having strong correlation as a candidate.

It will be specifically explained about the computational equation of a matching computation for computing a correlation value by using the appellations (nicknames). The correlation computing unit 12d sequentially performs: a process to determine whether the nicknames are perfectly identical to each other; a process to determine whether they are identical to each other when the half size and full size of a character and the upper case and lower case of a character are ignored; and a process to determine whether they are identical to each other when the difference between languages (for example, English and Japanese) is absorbed. When they are not identical with each other as the result of all the above processes, the correlation computing unit 12d computes a correlation value by using the following computation.

The correlation computing unit 12d divides the nickname into words that are previously registered in a dictionary and retrieves the words that are previously registered in the dictionary to determine whether the divided words are identical thereto. The correlation computing unit 12d sets "i1=1" when there is an identical retrieval word and sets "i1=0" when there is not an identical retrieval word. It is assumed that a concordance rate for words (for example, 66% when two words of three words are identical to each other) is "x" and weighting is "a". When the language difference by a dictionary is absorbed at the time of the word concordance, it is assumed that the weighting is "b".

Next, when there is not a word that is identical to the registered words, the correlation computing unit 12d determines whether there is an identical retrieval character. The correlation computing unit 12d sets "i2=1" when there is an identical retrieval character and sets "i2=0" when there is not an identical retrieval character. It is assumed that a concordance rate for characters (for example, the concordance rate of "abc" and "adc" is 66%) is "y" and weighting is "c". The alignment sequence of characters may be ignored.

Next, the correlation computing unit 12d sets "i3=1" when there is an identical retrieval number and sets "i3=0" when there is not an identical retrieval number. It is assumed that the concordance rate of 0% or 100% is "z" and weighting is "d". Then, the correlation computing unit 12d calculates a concordance rate as a correlation value by using the computational equation illustrated in FIG. 7. As illustrated in FIG. 7, because numbers are a comparatively important key, the weight of "d" is increased.

Figure 8:
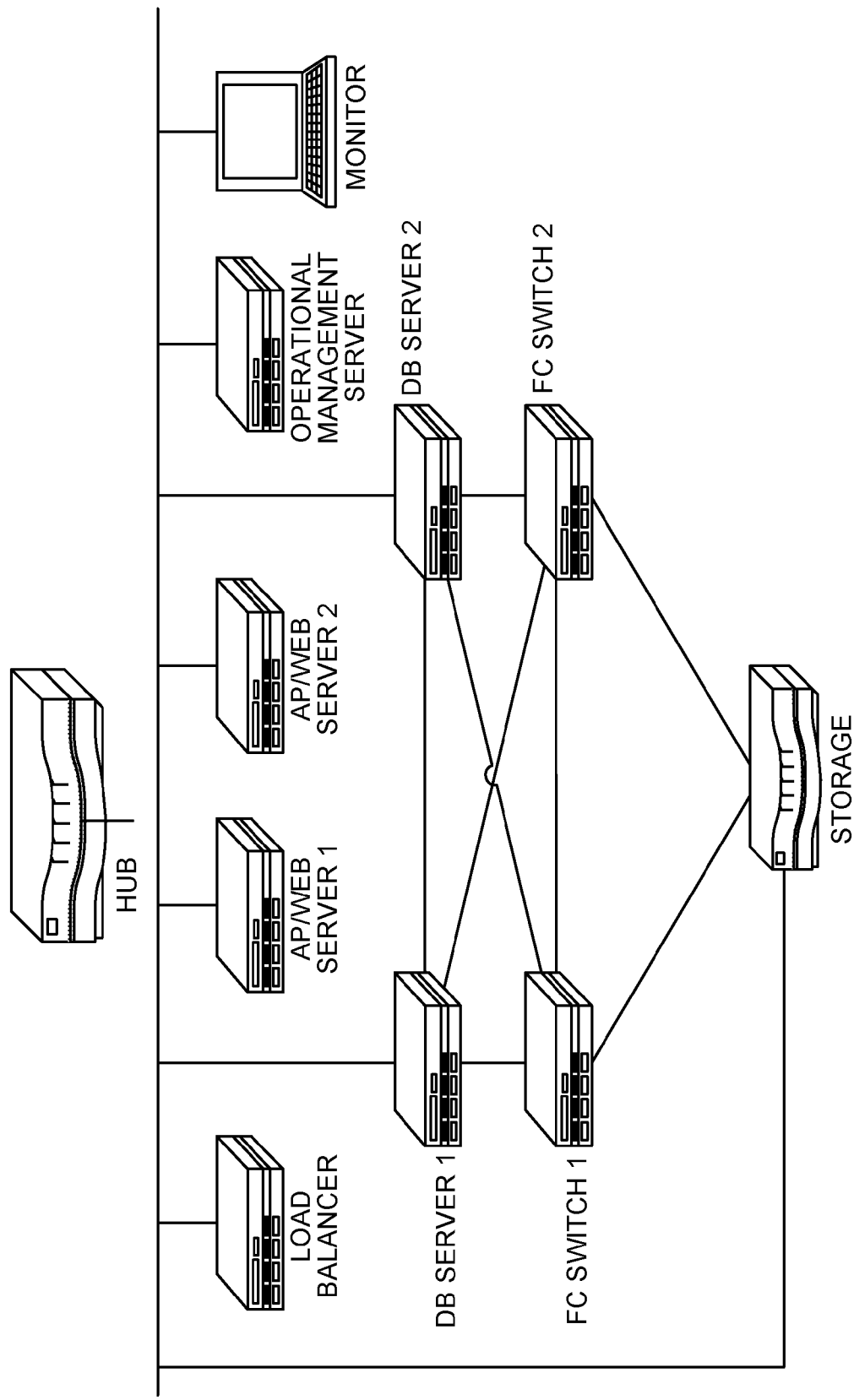
FIG. 8 is a diagram illustrating an example of a schematically designed diagram.
Figure 9:
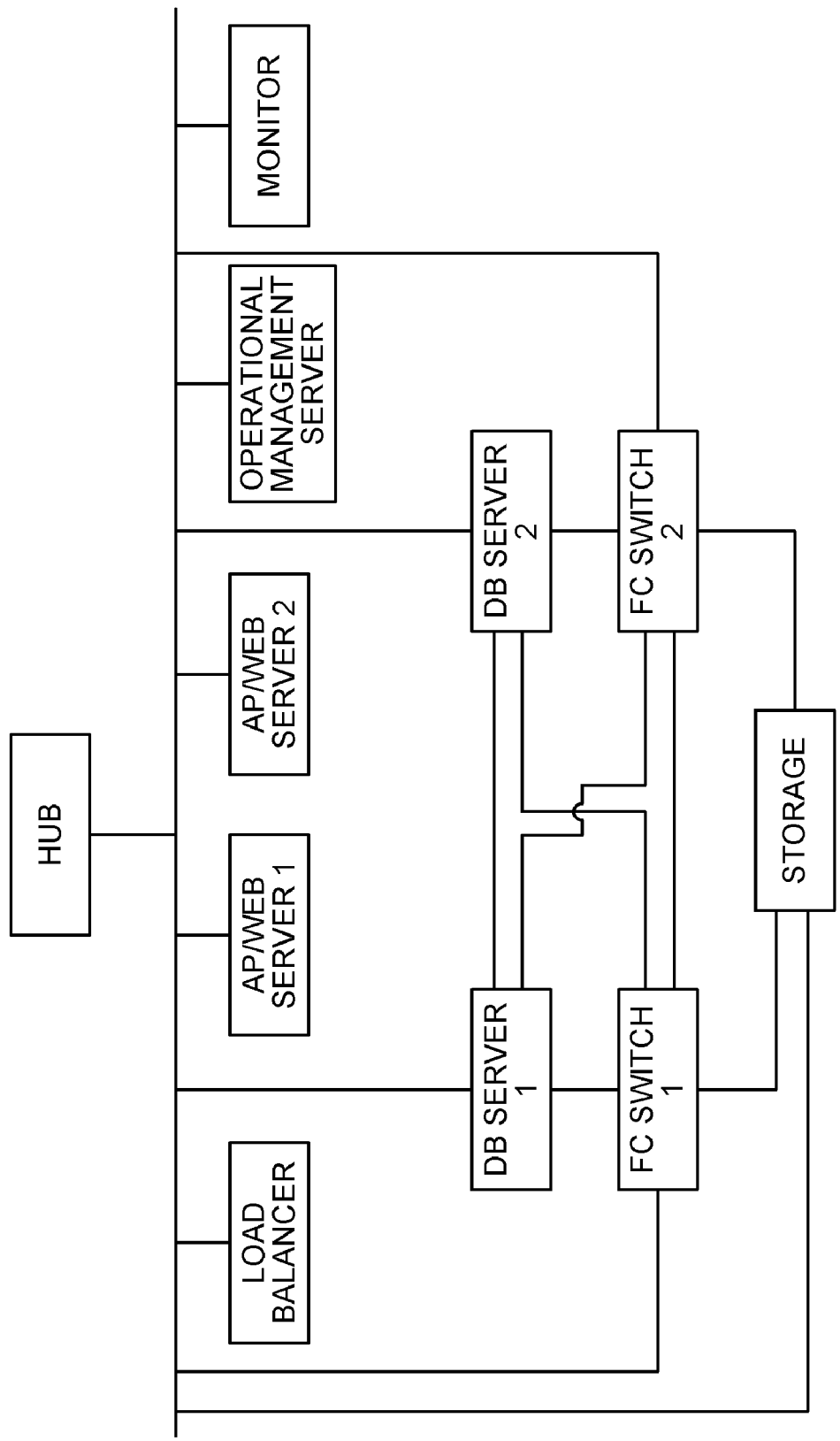
FIG. 9 is a diagram illustrating an example of a network connection diagram.
Figure 10:
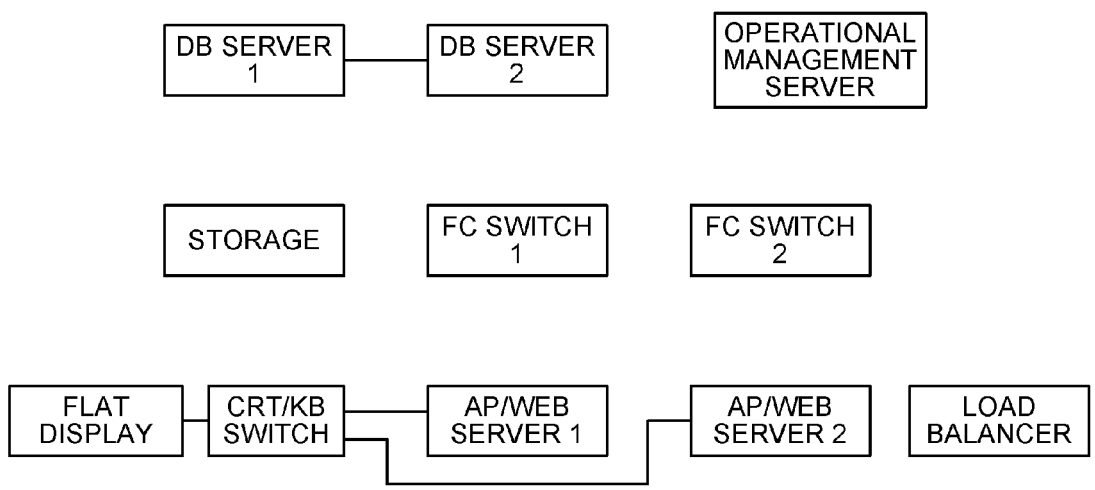
FIG. 10 is a diagram illustrating an example of a hardware connection diagram.
Figure 11:
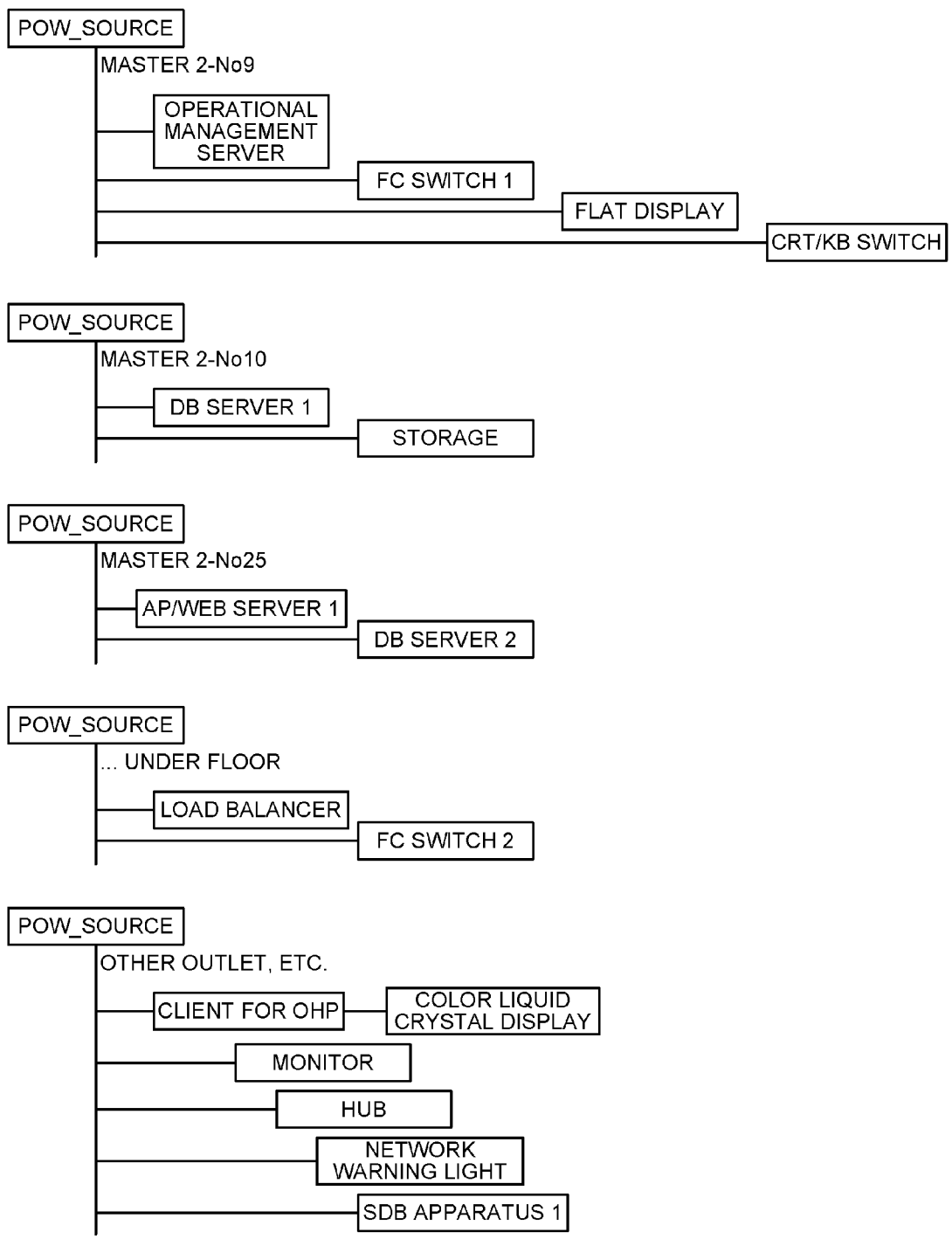
FIG. 11 is a diagram illustrating an example of a power supply connection diagram.

As illustrated in FIG. 8, each person in charge of a detailed design performs a detailed design in CAD referring to a schematically designed diagram. Therefore, the person basically performs the detailed design by using the nicknames described in the schematically designed diagram. Some differences may occur because the work is dependent on persons. However, as illustrated in FIG. 9 to FIG. 11, there is not a large difference between appellations of respective portions.

For this reason, the correlation between the design data can be computed from the concordance rate for the nicknames and be used as auxiliary information for merging determination. In addition, the words used in a design target (network system) can be previously registered in the dictionary in order to absorb a language difference and increase the precision of the matching computation.

When it is determined that the product names given to each design data are the same as or similar to each other, the merged data creating unit 12e merges design data, creates data by merging the plurality of design data, and makes the after-merging data managing table 13c store the created data. Moreover, when it is determined that the product names given to respective design data are not the same as each other, the merged data creating unit 12e merges design data having the most frequent product names among the product names given to respective design data, creates data obtained by merging the plurality of design data, and makes the after-merging data managing table 13c store the created data.

Moreover, when it is determined that the design data having the same product name is present, the merged data creating unit 12e merges design data having the same product name, creates data by merging the plurality of design data, and makes the after-merging data managing table 13c store the created data. Moreover, the merged data creating unit 12e merges design data that have the highest correlation value, creates data by merging the plurality of design data, and makes the after-merging data managing table 13c store the created data.

Specifically, the merged data creating unit 12e sequentially traces the merged data lines of the merging determination working table 13b for each identifier and determines whether there is one or more effective portion flags for each identifier. As a result, when there is one or more effective portion flags, the merged data creating unit 12e links the mounted product managing table to the product library managing table in the after-merging data managing table 13c.

Then, the merged data creating unit 12e creates a portion managing table in the mounted product managing table in accordance with the setting situation for the portion flag in the after-merging data managing table 13c. Next, the merged data creating unit 12e traces and retrieves the product library managing table from the data managing table and confirms whether there is already a product library managing table for the identifier.

After that, the merged data creating unit 12e determines whether there is a product library managing table. When there is not a product library managing table, the merged data creating unit 12e copies product library managing information from the data to be merged and links the copied information to the data managing table of a merging destination.

Then, when all the identifiers in the merged data lines have been processed, the merged data creating unit 12e makes the after-merging data managing table 13c store the data managing table for the merged data and the subordinate data. Moreover, as illustrated in FIG. 12, when a manual merging instruction is received from the user interface unit 11, the merged data creating unit 12e merges design data in accordance with the merging instruction.

The design data output unit 12f reads out the data stored in the after-merging data managing table 13c and outputs the data to the after-merging design data DB 30.

Process by Design Data Merging Apparatus

Figure 16:
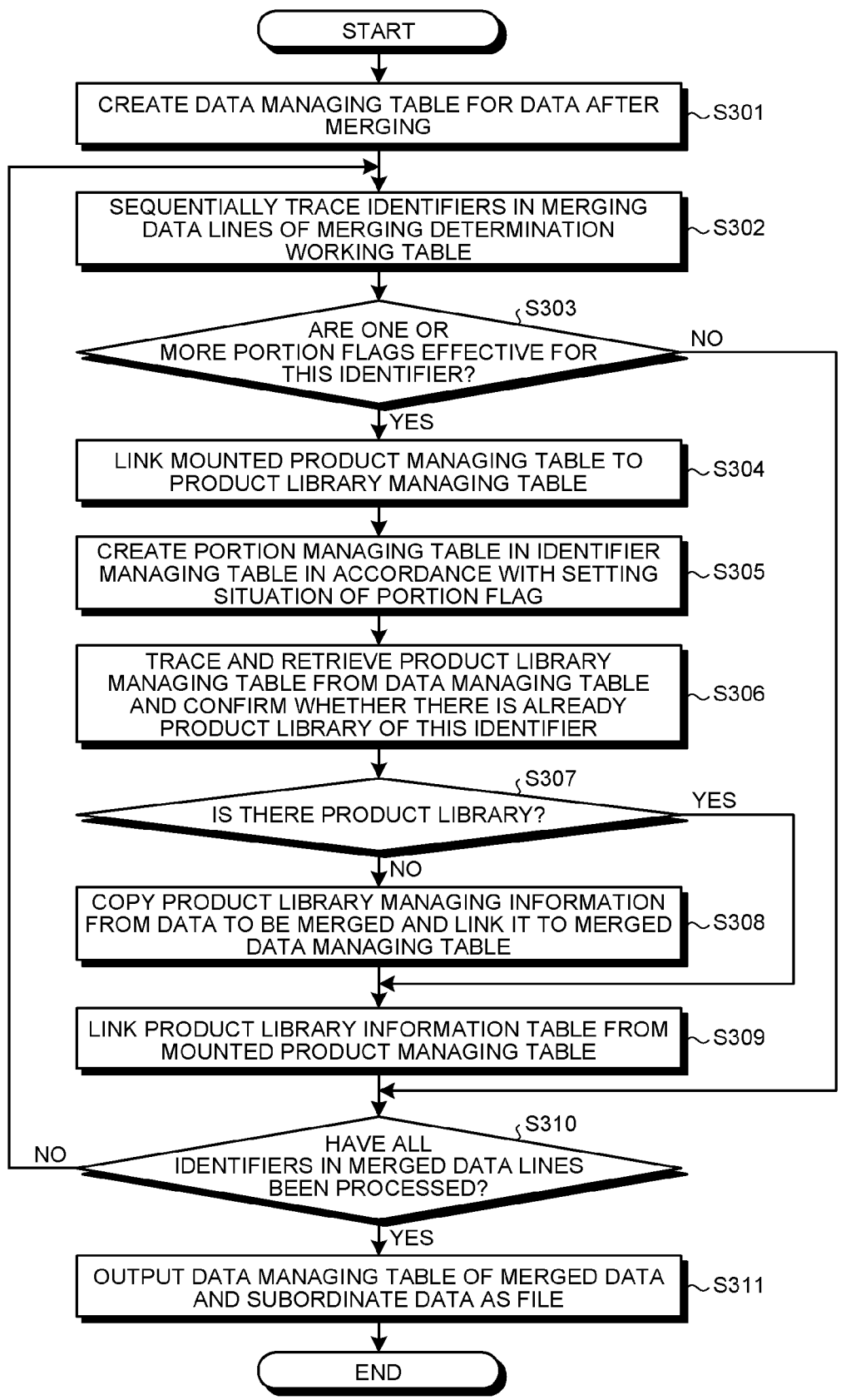
FIG. 16 is a flowchart illustrating a process operation for creating design data of the design data merging apparatus according to the first embodiment.

Next, it will be explained about a process performed by the design data merging apparatus 10 according to the first embodiment with reference to FIG. 14 to FIG. 16. FIG. 14 is a flowchart illustrating a process operation performed in the design data merging apparatus 10 according to the first embodiment. FIG. 15 is a flowchart illustrating a process operation for creating the merging determination working table of the design data merging apparatus 10 according to the first embodiment. FIG. 16 is a flowchart illustrating a process operation for creating design data of the design data merging apparatus 10 according to the first embodiment.

As illustrated in FIG. 14, when the plurality of data to be merged is read (Step S101), the design data merging apparatus 10 performs a process (explained later in detail with reference to FIG. 15) for creating the merging determination working table 13b (Step S102). Then, the design data merging apparatus 10 decides the merged data of the merging determination working table 13b with respect to the product of the identifier that can be merged without inconsistency (Step S103).

Then, the design data merging apparatus 10 determines whether a product for which merging cannot be simply determined remains by using the merging determination working table 13b. Specifically, the design data merging apparatus 10 determines whether the mismatch occurs or not with respect to the identifier and the product name in the merging determination working table 13b.

As a result, when it is determined that the match occurs with respect to the identifier and the product name and the merging can be performed (Step S104: NO), the design data merging apparatus 10 modifies the identifiers and completes the merging determination working table 13b in accordance with the merged data of the completed merging determination working table 13b (Step S111). After that, the design data merging apparatus 10 merges the design data for respective portions with respect to a common product in accordance with the merging determination working table 13b and outputs the design data after merging to the after-merging design data DB 30 (Step S112).

Moreover, when the mismatch occurs with respect to the identifier and the product name and a product for which merging cannot be simply determined remains (Step S104: YES), the design data merging apparatus 10 determines whether a correspondent candidate can be made based on a product name (Step S105). As a result, when a correspondent candidate can be made based on a product name (Step S105: YES), the design data merging apparatus 10 makes a merging candidate (Step S106).

On the other hand, when a correspondent candidate cannot be made based on a product name (Step S105: NO), the design data merging apparatus 10 performs weighting on a merging candidate by using auxiliary information (Step S107).

After that, the design data merging apparatus 10 creates a screen that is a table for asking the designer to make merging determination and receives an merging instruction (Step S108). Then, the design data merging apparatus 10 performs a replacing process (explained later in detail with reference to FIG. 16) for replacing a merging product on the basis of the instruction of the designer (Step S109).

Then, the design data merging apparatus 10 determines whether the merging has been decided for all the products (Step S110). As a result, when the merging has not been decided for all the products (Step S110: NO), the design data merging apparatus 10 returns to Step S109 and repeats the replacing process for replacing the merging product.

When the merging has been decided for all the products (Step S110: YES), the design data merging apparatus 10 modifies identifiers in accordance with the merged data of the decided merging determination working table 13b and completes the merging determination working table 13b (Step S111). After that, the design data merging apparatus 10 merges the design data for respective portions with respect to a common product to perform a process (explained later in detail with reference to FIG. 16) for creating design data in accordance with the merging determination working table 13b and outputs the design data after merging to the after-merging design data DB 30 (Step S112).

Next, it will be explained about a process for creating the merging determination working table performed in the design data merging apparatus 10 with reference to FIG. 15. As illustrated in FIG. 15, the design data input unit 12a of the design data merging apparatus 10 reads a design file to be merged from the before-merging design data DB 20 (Step S201) and determines whether the already-read data exists in the data managing table 13a (Step S202).

When the already-read data exists in the data managing table 13a (Step S202: YES), the design data input unit 12a links the presently-read data managing table to the back of the existing data managing table (Step S203). On the other hand, when the already-read data does not exist in the data managing table 13a (Step S202: NO), the design data input unit 12a treats the presently-read data managing table as leading data (Step S204).

Then, the design data input unit 12a determines whether a file to be merged is still in the before-merging design data DB 20 (Step S205). When a file is still therein (Step S205: YES), the design data input unit 12a returns to Step S201 and repeats the process.

On the other hand, when a file to be merged that has not been read is not in the before-merging design data DB 20 (Step S205: NO), the working table creating unit 12b sequentially traces the data managing table (Step S206) and traces the mounted product managing table that is subordinate to the data managing table (Step S207).

Then, the working table creating unit 12b searches for an identifier from the merging determination working table 13b and adds a new identifier when the identifier does not exist therein (Step S208). Then, the working table creating unit 12b sets a portion flag for each identifier in the merging determination working table 13b by using the portion information of the identifier (Step S209).

After that, the working table creating unit 12b determines whether all the identifiers have been traced (Step S210) and returns to Step S207 to repeat the above process if all the identifiers have not been traced (Step S210: NO). On the other hand, when all the identifiers have been traced (Step S210: YES), the working table creating unit 12b determines whether all the data have been traced (Step S211).

As a result, when all the data have not been traced (Step S211: NO), the working table creating unit 12b returns to Step S206 to repeat the above process. On the other hand, when all the data have been traced (Step S211: YES), the working table creating unit 12b terminates the process for creating the merging determination working table.

Next, it will be explained about a process for creating design data in the design data merging apparatus 10 with reference to FIG. 16. As illustrated in FIG. 16, the merged data creating unit 12e of the design data merging apparatus 10 starts creating the data managing table for the data after merging (Step S301).

The merged data creating unit 12e sequentially traces in the merged data lines of the merging determination working table 13b for each identifier (Step S302) and determines whether there are one or more effective portion flags with respect to the identifier (Step S303).

As a result, when there are one or more effective portion flags (Step S303: YES), the merged data creating unit 12e links the mounted product managing table to the product library managing table in the after-merging data managing table 13c (Step S304).

Then, the merged data creating unit 12e creates a portion managing table in the mounted product managing table in accordance with the setting situation of the portion flag in the after-merging data managing table 13c (Step S305). Next, the merged data creating unit 12e traces and retrieves the product library managing table from the data managing table and confirms whether there is already the product library managing table for an identifier (Step S306).

After that, the merged data creating unit 12e determines whether there is a product library managing table (Step S307). When there is not a product library managing table (Step S307: NO), the merged data creating unit 12e copies product library managing information from the data to be merged and links the information to the data managing table of a merging destination (Step S308).

Then, the merged data creating unit 12e links the mounted product managing table to the product library managing table from (Step S309) and determines whether all the identifiers in the merged data lines have been processed (Step S310). When all the identifiers in the merged data lines have not been processed (Step S310: NO), the merged data creating unit 12e returns to Step S302.

On the other hand, when all the identifiers in the merged data line have been processed (Step S310: YES), the merged data creating unit 12e makes the after-merging data managing table 13c store the data managing table of the merged data and the subordinate data (Step S311) and terminates the process for creating design data.

Effect of First Embodiment

As described above, the design data merging apparatus 10 determines whether the product names given to each design data are the same for the plurality of design data of which the identifier for uniquely identifying a product is the same. When it is determined that the product names given to each design data are the same, the design data merging apparatus 10 merges the design data and creates merged data obtained by merging the plurality of design data. For this reason, the design data merging apparatus 10 automatically performs a process for merging the plurality of design data for the same product. As a result, the design data merging apparatus 10 can efficiently manage design data for each product.

Moreover, according to the first embodiment, when it is determined that the product names given to each design data are not the same, the design data merging apparatus 10 merges design data having the most frequent product name among the product names given to each design data and creates merged data. For this reason, even if the product names are different, the merging process can be appropriately performed.

Moreover, according to the first embodiment, when design data has an identifier which is different from identifiers of other design data, the design data merging apparatus 10 determines whether design data that has the same product name as that given to this design data exists. Then, when it is determined that design data that has the same product name exists, the design data merging apparatus 10 merges the design data that have the same product name and creates merged data obtained by merging the plurality of design data. For this reason, the design data merging apparatus 10 can appropriately perform the merging process by treating design data having an isolated identifier as design data having an incorrect identifier.

Moreover, according to the first embodiment, the design data merging apparatus 10 computes a correlation value indicative of a probability by which these design data are design data related to the same product by using the appellations given to the design data, merges the design data that have the highest computed correlation value, and creates merged data. For this reason, the merging process can be appropriately performed by using nicknames or the like described by a person in charge of design.

Moreover, according to the first embodiment, when there is a plurality of design data of which the identifiers are not identical to one another and the product names are identical to one another, the design data merging apparatus 10 receives a merging instruction for merging any design data of the design data. When the merging instruction is received, the design data merging apparatus 10 merges the design data and creates merged data by merging the plurality of design data in accordance with the merging instruction. For this reason, because the merging process is automatically performed and is manually performed if required, the merging process can be appropriately performed.

[b] Second Embodiment

Although it has been explained about the example of the present invention, the present invention may be realized by various different configurations in addition to the embodiment described above. Therefore, it will be below explained about another embodiment covered by the present invention as the second embodiment.

[b-1] System Configuration

Each component of each device illustrated in the drawings is a functional concept. Therefore, these components are not necessarily constituted physically as illustrated in the drawings. In other words, the specific configuration of dispersion/integration of each device is not limited to the illustrated configuration. Therefore, all or a part of each device can dispersed or integrated functionally or physically in an optional unit in accordance with various types of loads or operating conditions. For example, the merging determination processing unit 12c and the correlation computing unit 12d may be integrated. Furthermore, all or a part of each process function performed by each device can be realized by CPU and a program that is analyzed and executed by the CPU, or can be realized by a hardware by wired logic.

Moreover, among the processes described in the present embodiments, the whole or a part of processes that have been automatically performed can be manually performed. Alternatively, the whole or a part of processes that have been manually performed can be automatically performed in a well-known method. Also, processing procedures, control procedures, specific titles, and information including various types of data and parameters, which are described in the description and the drawings, can be arbitrarily changed except that they are specially mentioned.

[b-2] Program

Figure 17:
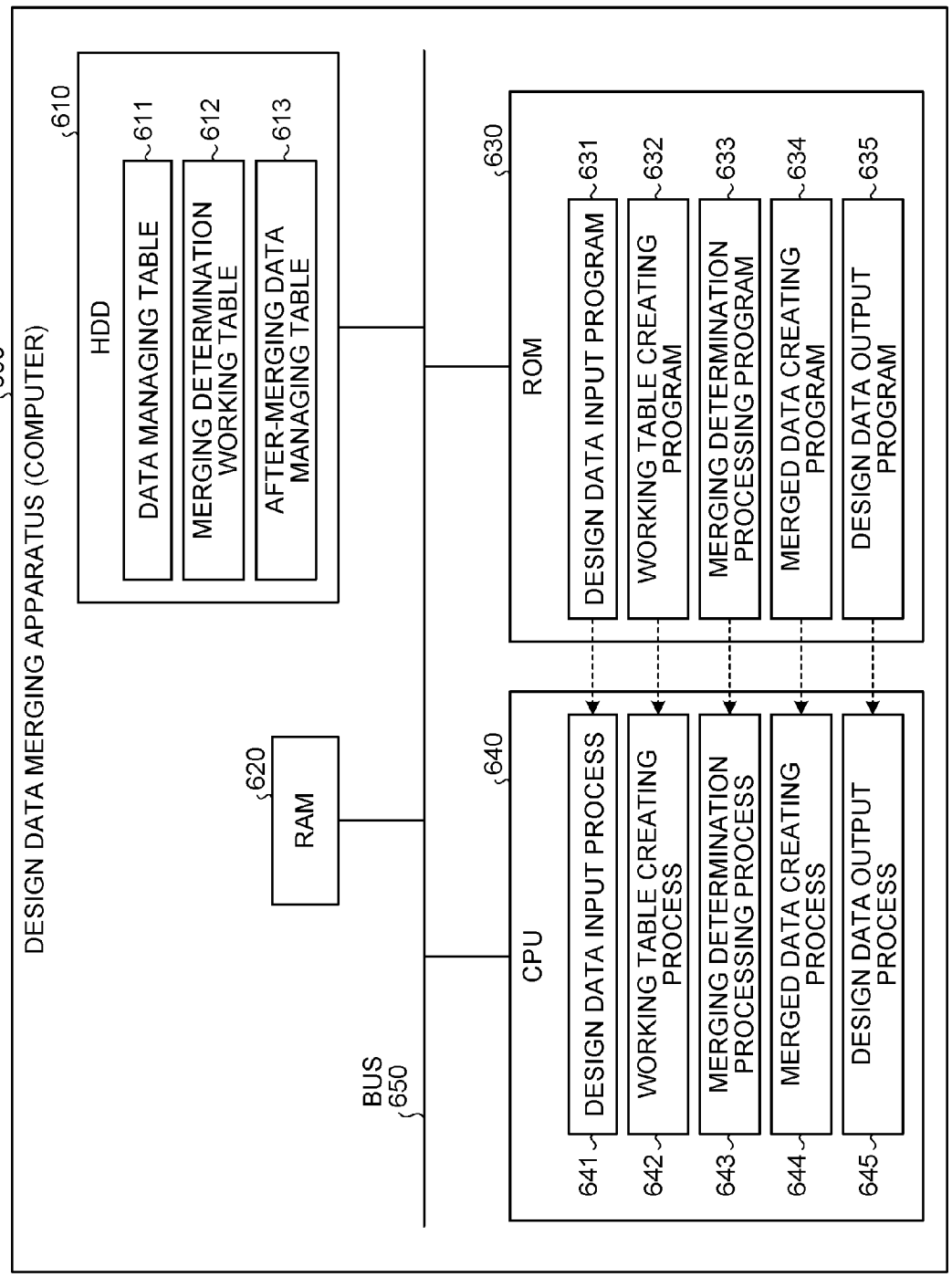
FIG. 17 is a diagram illustrating a computer that executes a design data merging program.
Figure 18:
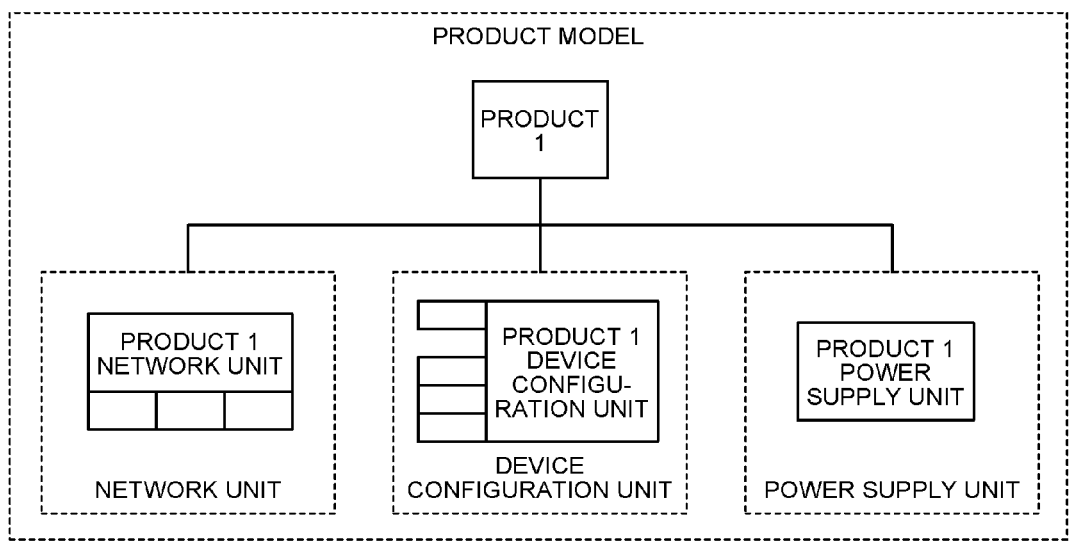
FIG. 18 is a diagram explaining a conventional technology.
Figure 19:
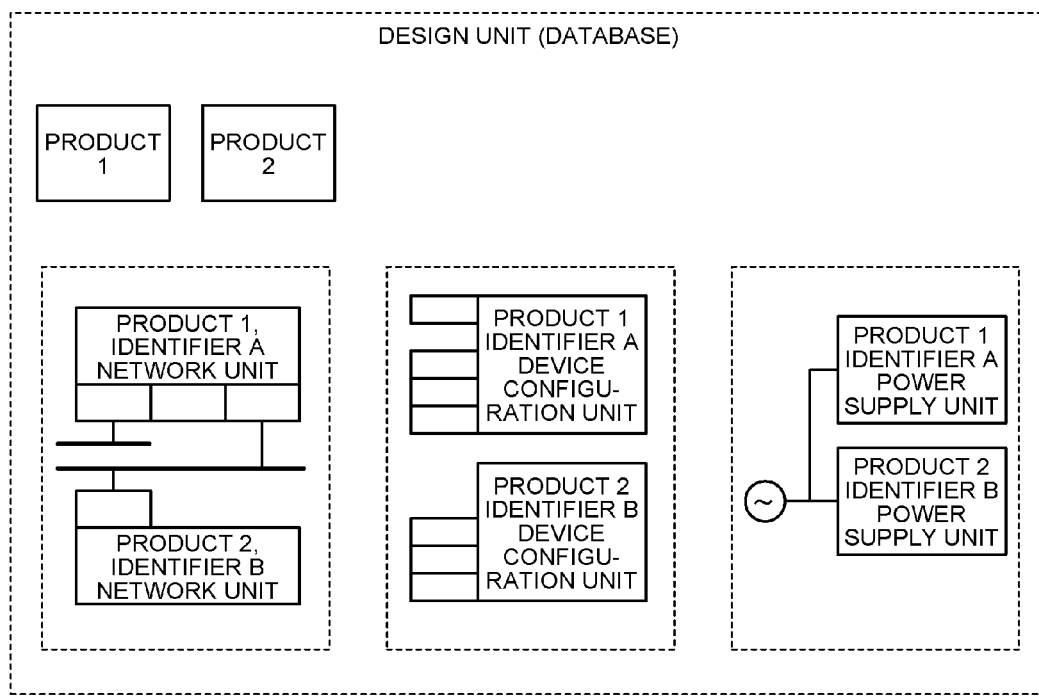
FIG. 19 is a diagram explaining a conventional technology.

Various types of processes explained in the embodiment can be realized by executing a previously-prepared program by a computer. It will be below explained about an example of a computer that executes a program having the same function as that of the embodiment with reference to FIG. 17. FIG. 17 is a diagram illustrating a computer 600 that executes a design data merging program.

As illustrated in FIG. 17, the computer 600 that functions as the design data merging apparatus includes an HDD (Hard Disk Drive) 610, a RAM (Random Access Memory) 620, a ROM (Read Only Memory) 630, and a CPU (Central Processing Unit) 640 that are connected to one another via a bus 650.

The ROM 630 previously stores therein the design data merging program having the same function as that of the embodiment. Specifically, the design data merging program includes a design data input program 631, a working table creating program 632, a merging determination processing program 633, a merged data creating program 634, and a design data output program 635 as illustrated in FIG. 17. In addition, the programs 631 to 635 can be appropriately dispersed or integrated similarly to each component of the design data merging apparatus 10 illustrated in FIG. 1.

The CPU 640 reads out the programs 631 to 635 from the ROM 630 and executes the programs to make the programs 631 to 635 function as a design data input process 641, a working table creating process 642, a merging determination processing process 643, a merged data creating process 644, and a design data output process 645 as illustrated in FIG. 17.

Moreover, the HDD 610 includes a data managing table 611, a merging determination working table 612, and an after-merging data managing table 613 as illustrated in FIG. 17. The CPU 640 registers data in the data managing table 611, the merging determination working table 612, and the after-merging data managing table 613. Also, the CPU 640 reads out various types of data from the data managing table 611, the merging determination working table 612, and the after-merging data managing table 613 to store the data in the RAM 620 and executes processes on the basis of the various types of data stored in the RAM 620.

As described above, according to an embodiment of the present invention, because the design data merging apparatus automatically performs a process for merging a plurality of design data for the same product, it is possible to effectively manage the design data for each product.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A design data merging apparatus comprising:
a computer; and
a memory storing instructions executed by the computer for:
a merging determining unit that determines, for a plurality of design data of which each has product name information and has a same identifier for uniquely identifying a product, whether the product name information given to the plurality of design data are the same; and
a merged data creating unit that merges the plurality of design data when it is determined by the merging determining unit that the product name information given to the plurality of design data are the same, and creates merged data obtained by merging a plurality of design data.

2. The design data merging apparatus according to claim 1, wherein the merged data creating unit merges, when it is determined by the merging determining unit that the product name information given to the plurality of design data are not the same, design data that have most frequent product name information among the product name information given to the plurality of design data and creates the merged data.

3. The design data merging apparatus according to claim 1, wherein
the merging determining unit determines, when the design data has an identifier which is different from any of the identifiers of other design data, whether design data having same product name information as that of the design data exists, and
the merged data creating unit merges, when it is determined by the merging determining unit that design data having the same product name information exists, the design data having the same product name information and creates merged data obtained by merging a plurality of design data.

4. The design data merging apparatus according to claim 1, wherein the memory further comprises instructions for a correlation computing unit that computes a correlation value indicative of a probability by which these design data are design data related to the same product by using the product name information given to the design data, wherein
the merged data creating unit merges design data that have a highest correlation value of the product name information computed by the correlation computing unit and creates the merged data.

5. The design data merging apparatus according to claim 1, wherein the memory further comprises instructions for a merging instruction receiving unit that receives, when there is a plurality of design data of which identifiers are not identical to one another and product name information are identical to one another, a merging instruction that indicates which design data to be merged, wherein
the merged data creating unit merges, when the merging instruction is received by the correlation computing unit, the design data in accordance with the merging instruction and creates merged data obtained by merging a plurality of design data.

6. A computer implemented design data merging method comprising:
determining, using a computer, for a plurality of design data of which each has product name information and has a same identifier for uniquely identifying a product, whether the product name information given to the plurality of design data are the same; and merging, using the computer, the plurality of design data when it is determined in the determining that the product name information given to the plurality of design data are the same, and creating merged data obtained by merging a plurality of design data.

7. A non-transitory computer readable storage medium having stored therein computer executable instructions which when executed on a computer execute a design data merging process comprising:

determining, for a plurality of design data of which each has product name information and has a same identifier for uniquely identifying a product, whether the product name information given to the plurality of design data are the same; and merging the plurality of design data when it is determined in the determining that the product name information given to the plurality of design data are the same, and creates merged data obtained by merging a plurality of design data.

* * * * *